Patented Nov. 2, 1926.

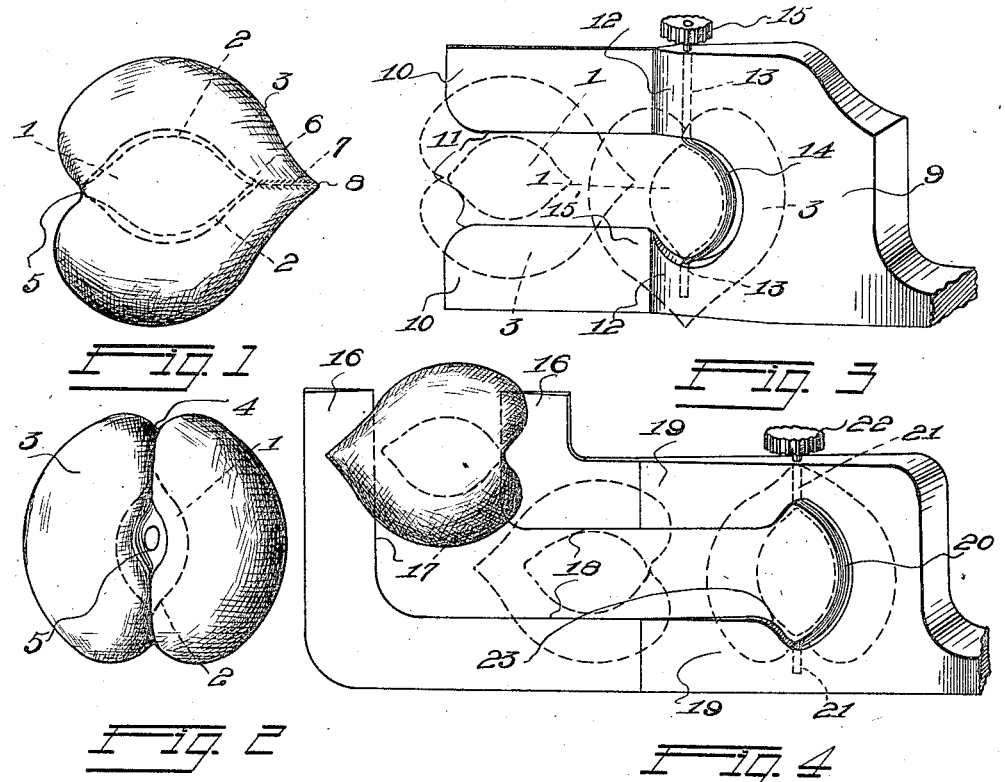
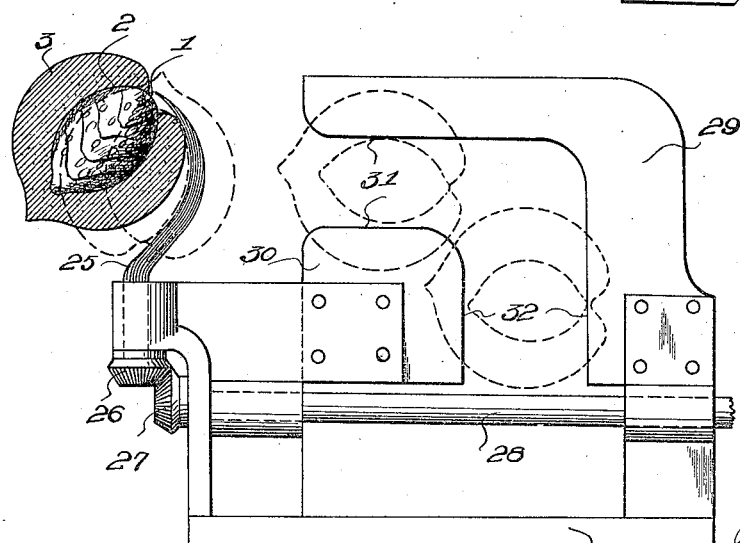

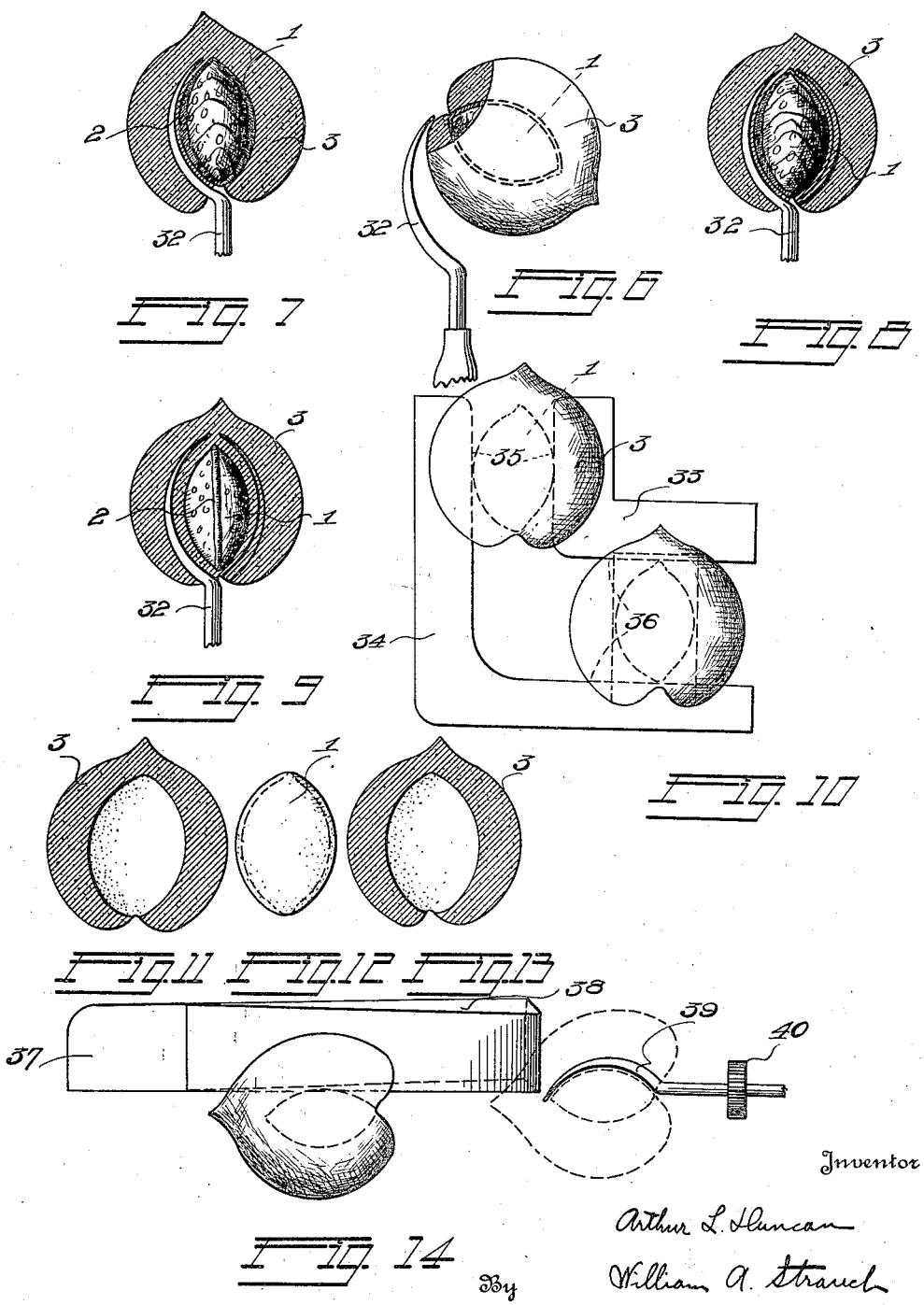

1,605,532

UNITED STATES PATENT OFFICE.

ARTHUR L. DUNCAN, OF PIEDMONT, CALIFORNIA.

FRUIT PITTING AND CORING METHOD.

Original application filed January 5, 1926, Serial No. 79,428. Divided and this application filed August 16, 1926. Serial No. 129,590.

The present application relates to coring and pitting fruit and like articles, and more particularly the invention relates to improvements for pitting or coring and trimming fruit such as clingstone peaches, free-stone peaches, plums, pears, apples and the like. The present application is a division of my copending application Serial No. 79,428, filed January 5, 1926.

In natural formation of single pit fruits such as peaches the pit consists of two curved side surfaces, and a rib or fin like edge formed around the suture of the sides substantially in the plane of greatest sectional area of the pit. At the point of attachment of the stem to the fruit, the pit comes practically to the surface of the flesh or pulp where there is a natural depression, and substantially in the plane of the fin like edge or rib of the pit a natural crease is formed on the outside of the fruit. Opposite the stem end of the fruit a spike is formed on the pit and on the pulp, while on some varieties a fibrous growth extends from the spike of the pit to the spike formation on the pulp.

It has been heretofore the practice in pitting clingstone peaches by hand to make a cut with a straight single-bladed knife around the fruit to the depth of the pit, following the line of the outside crease then to insert from the stem end of the fruit, along one of the curved sides of the pit as a guide, a curved spoon shaped pitting knife, the edges of which are sharp, this pitting spoon being inserted within the pulp and in substantial contact with the pit to a sufficient depth, till one curved side of the pit reposes within the hollow of the pitting spoon and in this position of repose, the central longitudinal line of the pitting spoon lies about midway between the lines of the fin like edge, rib or suture of the pit. The pitting spoon or knife is now forced by an oscillating movement through the pulp, from the position of repose to meet one side of the cut which is first made with the straight bladed knife, then receding through the pulp and meeting the opposite side of the cut made by the straight bladed knife. This separates one half of the peach. The other half, with the pit imbedded therein is then separated from the pit by gouging out the pit with the same curved pitting spoon. The pulp or flesh has now been separated substantially in halves, with the pit cut free in the manner above set forth. This prior hand process is relatively wasteful due to mutilation of a large percentage of the fruit by inexperienced and careless help, and is also slow and expensive.

I have discovered that when pitting fruit such as clingstone peaches improved results are obtained, and the pit may be economically removed if the natural crease and the fin like edge or rib formation or suture of the pit are utilized as a guide for insertion of the pitting spoon or knife. With the concept of utilizing as a basis, the fin like or ribbed edge of the pit and the natural crease on the outside of the fruit as guides, I have discovered various improved apparatus and methods of pitting or coring fruit such as clingstone peaches.

The preferred embodiments of my improved method of pitting comprise the steps of utilizing the natural crease formation to indicate the location of the fin like or ribbed edge of the pit, inserting a curved pitting knife or spoon in the pulp along the fin like or ribbed edge of the pit as a guide for starting the pit or core removing operation, and cutting the pit free from the pulp starting from the fin like or ribbed edge of the pit instead of from the curved side of the pit as has been heretofore the practice. The pulp of the fruit is cut to free the central core or pit either before or after, but preferably after the fruit is halved. In the preferred embodiments of my invention a channel or groove is formed in the pulp of the fruit to be pitted or cored preferably in the plane of the crease, either by removing a slice therefrom or by forming a wedge shaped cut or incision therein, or by separating the pulp in any other manner substantially to the core to be removed to permit the entry of the cutting knife or pitting spoon in the cut, channel, or incision, or in the line of the cut, channel or incision. The central core containing the pit and undesirable pulp sections is then cut free from the remaining pulp sections.

In the canning of high grade peaches, it is preferable to remove the crease formation of the pulp together with the fibrous material extending from the spike end of the pulp to the spike end of the pit. For this reason it is frequently desirable to remove a slice from the flesh of the fruit including the natural crease formation and fibers. The removal of the slice is however not essential to the practice of the invention, as the pulp may be cut in halves to permit removal of the pit or core, or may be divided in any suitable manner. In removing a slice from the fruit it is not necessary to remove a section of sufficient width to permit the entry of a pitting knife as the object of removing a slice is to trim the objectionable matter from the fruit pulp, such as the fibrous materials mentioned, extending from the spike end of the pit to the spike appearing on the outside of the fruit pulp. As this objectionable matter is confined to a narrow width the trimming strip can also be confined to a narrow width. If the crease and fibrous formation is to be removed it is preferable to remove just enough of the pulp to cut out the undesirable sections, and to wedge the parts of pulp apart the remaining distance to permit insertion of the pitting knife without mutilating the trimmed surface of the pulp. When the crease and fibrous formations are not to be removed, the pulp may be wedged apart a sufficient amount to permit entry of the pitting knife between the separated pulp sections, or if desired, a plain cut can be made and a pitting spoon can be inserted in the line of the cut. Preferably this cut should be made on the line of the outside crease to insure the pitting spoon being inserted in the line of the rib or fin-like edge or suture of the pit.

Certain varieties of peaches have a red colored pulp surrounding the pit which if not removed is unsightly and causes discoloration of the remainder of the pulp in the course of canning. For this reason it is desirable in many varieties of peaches to remove a central core comprising a portion of the pulp adhering to or adjacent the pit from the remainder of the pulp. In freestone peaches, the portion of the pulp adjacent the pit is ordinarily irregular and unsightly and even though the reddish discoloration does not exist, it is desirable to remove a portion of the pulp adjacent the pit to present regular cavities in the portions to be canned. Before the pulp is separated into halves, the central core or pit and pulp to be removed may be cut free from the remainder of the fruit in accordance with certain forms of my invention. This method of operation while not desirable in the handling of the clingstone fruits, possesses certain advantages in handling the freestone fruits.

Accordingly an object of the present invention is to provide improved methods and apparatus for coring and pitting fruit.

Another object of the invention is to provide improved methods and apparatus separating a fruit in halves or sections and for removing a central core or pit therefrom.

Further objects of the invention are to provide improved methods and apparatus for cutting fruit into sections so that the cut edges will present smoot, even and trimmed surfaces; preferably to remove the fibrous growth extending from the spike end of the pit through the pulp of the fruit and to cut the pit therefrom and present a smooth even pulp body in the cavity occupied by the removed pit; to provide a mechanically operated apparatus capable of operating on a greater number of fruits within a given time than is possible within the same time to be accomplished by present hand methods, and thereby increasing production and reducing the cost of halving, pitting and trimming the fruit.

Other objects of the invention are such as may be attained by a utilization of the various combinations, sub-combinations, steps and principles in the relations to which they are adaptable by those skilled in the art without departing from the spirit of the invention and as set forth by the terms of the appended claims.

As shown in the drawings:

Figure 1 is a side elevation of a peach.

Figure 2 is a plan view of a peach showing the natural crease formation.

Figure 3 is a perspective view showing one form of apparatus for carrying out my invention.

Figure 4 is a perspective view showing another form of apparatus for carrying out the invention.

Figure 5 is a side elevation of still another form of apparatus for carrying out the invention.

Figures 6 to 10 inclusive illustrate one method of carrying out my invention by hand.

Figures 11, 12 and 13 illustrate a fruit after it has been cored or pitted in accordance with my invention.

Figure 14 illustrates a further modification and apparatus for carrying out the invention.

The invention is especially adapted for the pitting of single stone fruits such as peaches and the preferred embodiments herein set forth are especially adapted for coring and pitting peaches, but the application thereof to coring or pitting various other fruits will be obvious to those skilled in the art. Accordingly, as shown in Figures 1 and 2, a natural peach formation comprises a pit 1 with curved side surfaces and around the suture of the curved sides a fin like edge or rib 2 is formed. The pulp 3 of the fruit forms around the pit and substantially in the plane of the suture and fin like edge or rib of the pit, a natural crease 4 appears in the pulp of the fruit. At the stem end of the pit, there is formed a natural depression 5 in the pulp of the fruit and the end of the pit comes approximately to the surface. Opposite the stem end of the pit a spike 6 ordinarily forms. Extending from the spike 6 in some varieties of peach is a fibrous growth 7 which terminates in a spike formation 8 opposite the stem end and on the pulp of the fruit.

One form of apparatus for carrying out my invention is shown in Figure 3. This form comprises a member 9 adapted to be supported in any suitable manner. Supported from the forward end of member 9 are the spaced cutting blades 10 provided with the substantially parallel cutting edges 11. Blades 10 merge into the narrow end wedging sections 12 and journalled in the wedging sections 12 in any suitable manner are supporting spindles 13 for a curved pitting knife 14. Knife 14 is adapted to be rotated under control of the operator by hand or in any suitable manner, as for example by means of pinion 15 secured to spindle 13 driven in any well known manner. Cutting edges 11 and inner edges 15' of the wedging sections 12 are spaced apart a sufficient distance to permit the passage of a fruit to be pitted, when held with the plane of the natural crease and suture of the pit substantially in the plane of the cutting edges 11 and preferably with a line passing through the stem and spike ends of the pit substantially parallel to the edges 11. Knife 14 is of such width and is normally positioned so that it lies within limits of the side planes of the wedging sections 12 and to the right of the axis of the spindles 13 as shown in Figure 3. In operation the fruit to be cored or pitted is then forced to the right between blades 10 with the plane of the crease substantially in the plane of the cutting edges 11 and preferably with a line through the stem and spike ends of the fruit substantially parallel to the cutting edges 11. The fruit is given a half turn as it enters and passes over the wedging sections 12, the inclined side surfaces wedge the pulp apart a sufficient distance to permit the positioning of the fruit as shown by the dotted outline in Figure 3 with the pitting knife 14 adjacent one side and substantially in the plane of the fin like edge or rib of the pit. With the fruit held in this position, and the wedging sections 12 engaging the separated pulp sections, pitting knife 14 is given a half turn around the pit 1 of the fruit thus severing one half section of the fruit pulp. Then with the other half section clamped or held firmly in position in any suitable manner and bearing tightly against wedging section 12, pitting knife 14 completes its turn around pit 1 of the fruit and the central core lying within the path of rotation of the pitting knife 14 including the pit and undesirable central pulp section is cut free from the remainder of the pulp 3. The pulp halves are now separated and the central core embodying the pit is freed.

In Figure 4 a form of pitting apparatus is disclosed in which a pair of angular cutting members 16 are provided with the cutting edges 17 and 18 and are integrally formed with or connected to the wedging sections 19. Cutting edges 17 are preferably spaced apart a sufficient distance to permit the passage of a fruit with a line through the stem and spike end of the pit substantially at right angles to edges 17. Edges 18 are disposed at an angle preferably a right angle to and in the plane of edges 17 and are spaced apart a sufficient distance to permit the passage of the fruit with a line through the stem and spike end of the pit substantially parallel to and in the plane of edges 18 as indicated in the drawing. The curved pitting knife 20 is shaped to conform substantially with the contour of the fin like edge or rib formation of one side of the pit from the spike to the stem end, and is suitably supported on spindles 21 journalled in the wedging sections 19. Knife 20 may be rotated by a pinion 22 and is of such width and so positioned that it will normally lie within the sides or wedging plane surfaces or the wedging sections 19, in an opening or recess 23 shaped to receive the pit of the fruit to be cored with the line through the stem and spike end of the pit substantially aligned with the axes of the spindles 21. In operation of this form of the invention the fruit to be pitted is held by the operator with the plane of the crease substantially in the plane of the cutting edges 17 and with a line through the spike and stem ends of the pit substantially at right angles to the edges 17. The fruit is then forced downward between the cutting blades 16 and is then forced forward with the plane of the crease substantially in the plane of the cutting edges 18 and with the line through the stem and spike end of the fruit substantially parallel to the cutting edges 18. When the fruit reaches the beginning of the wedging sections 19 the pulp will have been cut completely around its periphery due to motion between the angular spaced cutting edges, and as the cut fruit is forced past wedging sections 19 the pulp will be wedged apart. As the pit of the fruit enters the opening or recess 23 in the wedging sections 19 the operator rotates the fruit until the line through the stem and spike ends of the pit is substantially in alignment with the axes of the spindles 21 and then causes a complete turn of the cutting knife 20 with the fruit held in the position indicated in Figure 4. This will cut the separated halves of the pulp free from the central core or pit.

Referring to Figure 5 a form of apparatus is shown in which the central core or pit is cut away from the adhering pulp. In this form of the invention a supporting framework 24 is provided upon which is journaled a curved pitting knife 25 shaped to conform with the contour of the fin like or ribbed edge of a pit of the fruit to be cored. Pitting knife 25 is driven by a bevel or miter gear 26 secured thereto which meshes with a bevel or miter gear 27. Gear 27 is secured to and driven in any suitable manner under the control of the operator. Secured to the supports 24 are the angular cutting knives 29 and 30 provided with the substantially parallel cutting edges 31 and 32. The cutting edges 31 are spaced apart a sufficient distance to permit the passage of fruit to be pitted with stem and spike ends of the pit disposed in a line substantially parallel to and in the plane of the edges 31. Edges 32 are spaced apart a sufficient distance to permit the passage of the fruit to be divided with a line through the spike and stem ends of the pit disposed substantially at right angles to and in the plane of the cutting edges 32. In operation of this form of device, the fruit to be cored is impaled by the operator as indicated in Figure 5 on the pitting knife 25 with the knife substantially in the plane of the crease and suture of the pit and with the one edge of the pit from the stem end to the spike end lying within the curve of the pitting knife as indicated in the drawing by the dotted outline of the fruit. With the fruit held in this position by the operator, the pitting knife is caused to turn through at least one revolution cutting the central core comprising the pit free from the pulp. The fruit is then withdrawn from the knife 25 and is passed between the cutting blades 29 and 30 as indicated by the dotted line positions of the fruit preferably with the plane of the crease and suture of the pit in the plane of the cutting edges. The passage of the fruit between the cutting edges 31 and 32 separates the pulp into halves and the plup having been freed from central core or pit, the separated halves may be removed.

In Figures 7 and 9 the manner of carrying out my invention by hand is indicated. When the invention is carried out by hand a pitting knife 32 shaped to conform substantially with the contour of the pit shape from the stem to the spike end along the fin like or rib edge is inserted from the stem end of the fruit along the fin like or rib edge of the pit from the stem end of the fruit and preferably substantially in the plane of the natural crease formation as indicated in Figures 6 and 7. The central core including pit is then severed from the remainder of the fruit by causing the passage of the pitting knife through the pulp either by rotating the knife, the fruit, or both as indicated in Figures 8 and 9. After the central core has been cut free from the remainder of the pulp the knife 32 is withdrawn and the fruit may be halved in any suitable manner, for example, by removing a slice including the crease and fibrous formations in the manner set forth in my patents numbered 1,441,490 and 1,534,507.

A convenient form of apparatus for separating the pulp into halves either before or after the central core has been cut free from the remainder of the fruit is shown in Figure 10. In this form of device a pair of angular cutting blades 33 and 34 are suitably supported in any desired manner with the cutting edges 35 and 36 parallel to each other substantially in the same plane. The cutting edges 35 are spaced apart a sufficient distance to permit the passage of a fruit to be divided with the stem and spike ends of the pit disposed substantially midway between the edges 35, and edges 36 are disposed apart a sufficient distance to permit the passage of the pit with a line through the stem and spike ends of the pit disposed substantially at right angles to and in the plane of edges 36. The fruit to be cut is forced between the blades 33 and 34 as indicated preferably with the plane of the crease or suture substantially in the plane of the cutting edges, and a cut will be formed entirely around the pulp of the fruit.

In pitting peaches by first cutting the core including the pit from the remainder of the pulp and then halving the pulp it is preferable to pass the fruit between the blades in such manner that the fruit is divided substantially in the plane of the crease, but this is not essential, as the pulp may be divided in any other plane to free the halves from each other and permit the removal of the central core or pit. After the fruit has been treated in accordance with my improved invention, it will be separated into pulp sections and a central core containing the pit as indicated in Figures 11, 12 and 13 of the drawing.

In Figure 14 another form of apparatus for carrying out my invention is disclosed. A single cutting blade 37 may be provided which is connected to a wedging section 38. Disposed adjacent the end of the wedging section 38, is a curved pitting knife 39 which is adapted to encompass one side of the pit of the fruit to be treated along the fin like edge or rib. Knife 39 is suitably supported and may be rotated in any well known manner through a gear 40 under control of the operator. The fruit to be pitted is moved past the cutting edge of the blade 37 in a manner to cut the pulp substantially to the pit and preferably in the plane of the crease or suture of the pit as indicated in the drawing. As the fruit moves past the wedging section 38 the pulp is wedged apart sufficiently for positioning of the fruit as shown so that the curved pitting knife 39 will enter the incision or channel and encompass one edge of the pit from the stem to the spike end. With the fruit held in this position the operator causes a rotation of the pitting knife 39 to free the central core lined within the path of rotation of the knife 39 free from the remainder of the fruit. The fruit is then withdrawn and the pulp separated into halves in any suitable manner to permit the removal of the central core or pit. If desired a cut may be formed completely around the fruit by turning the same against the cutting edge of the knife 37 prior to wedging the pulp apart to permit entry of the knife. The pulp is then wedged apart, and presented to knife 39 in the manner above set forth. After the knife 39 has made one complete revolution, the separated halves of the pulp will be freed from the central core and the pitting operation will be completed.

Another form of apparatus for carrying out my invention is shown in my reissued Letters Patent Numbered 16,259 issued February 9th, 1926.

While the pitting of peaches has been specifically described it will be obvious that plums, apples, and like fruits may be cored and halved in accordance with my improved apparatus and my improved methods. It will be seen that the methods for coring and pitting fruits hereinbefore set forth may be carried out in various manners by hand and by different types of apparatus and it will be understood that the invention is not limited to the specific form of apparatus and methods hereinbefore set forth, but that various modifications therein may be made by those skilled in the art without departing from the spirit of the invention.

Accordingly, having described the preferred embodiments of my invention, what is desired to be secured by Letters Patent and claimed as new is:

1. The method of coring single pit fruit which includes the step of severing the undivided stone from the pulp by cutting laterally starting substantially from the plane of the suture of the pit with a cut that severs a central core having a surface of revolution centered substantially about the longitudinal axis of the pit and embodying the substantially intact pit and undesirable central pulp portions adjacent the pit.

2. The method of coring single pit fruits which includes the step of severing the undivided stone from the pulp by cutting laterally from the plane of the suture of the pit using the suture of the pit as a guide to determine the diameter of a core including the pit to be removed while maintaining the flesh of the fruit substantially unmutilated and causing the cut to sever a central core including the stone and undesirable pulp portions adjacent the stone.

3. The method of coring fruit which comprises forming a cut or groove in the flesh of the fruit extending substantially to the core to be removed; and then cutting the core from the flesh by a curved arcuate cut that conforms substantially to the shape of the pit in the plane of its suture and begins and ends in said first mentioned cut or groove.

4. The method of pitting a clingstone peach which comprises forming a circumferential groove in the flesh of the peach in the plane of the suture of the pit and extending substantially to the pit to substantially expose the edge of the pit at its greatest dimension; and then cutting the pit from the flesh by a cut that begins and ends in said groove.

5. The method of pitting a clingstone peach which comprises forming a circumferential halving channel in the flesh of the peach in the plane of the suture of the substantially intact pit, and then severing the pit from the halves by a cut that begins and ends in said channel and substantially follows a path of revolution about the longitudinal axis of the pit independent of the pit side walls.

6. The method of pitting a clingstone peach which comprises exposing a central core containing the substantially whole pit and then cutting the core from the flesh of the peach by a cut substantially following in a longitudinal direction throughout its length the contour of the pit in the plane of its suture and beginning and ending at said exposed portions of the core.

In testimony whereof I affix my signature.

ARTHUR L. DUNCAN.